UNITED STATES PATENT OFFICE.

HENRY LIVINGSTONE SULMAN AND SAMUEL FIELD, OF LONDON, ENGLAND, ASSIGNORS TO THE METALS EXTRACTION CORPORATION, LIMITED, OF LONDON, ENGLAND.

PURIFICATION OF ZINC SOLUTIONS.

1,336,386.  Specification of Letters Patent.  Patented Apr. 6, 1920.

No Drawing.  Application filed May 12, 1919.  Serial No. 296,553.

*To all whom it may concern:*

Be it known that we, HENRY LIVINGSTONE SULMAN and SAMUEL FIELD, subjects of the King of England, residing at London, England, have invented certain new and useful Improvements in the Purification of Zinc Solutions, of which the following is a specification.

This invention relates to improvements in the purification of zinc solutions, and it refers more particularly to the purification of zinc sulfate solutions obtained by the treatment of zinc ores or zinc-containing materials with sulfuric acid, from which solutions the zinc is subsequently deposited electrolytically.

As is well-known, to obtain a successful deposition of zinc by electrolysis the zinc sulfate liquors must be of a high order of purity; impurities, such as copper, cadmium, iron, antimony, arsenic, nickel and cobalt, must be eliminated or substantially so, as they affect adversely and very seriously the deposition both qualitatively and quantitatively. For example it is desirable that nickel and cobalt be each reduced to a quantity of the order of one-half to one part per million of liquor.

The elimination of the iron, copper, cadmium, arsenic and antimony is commonly effected with comparative ease, but it has been found that more difficulty is experienced in the removal of cobalt and nickel, and the present invention relates particularly to the purification of zinc solutions from these metals.

For the removal of copper, cadmium, and similar very electro-negative metallic impurities, tube milling with zinc balls or agitating the solutions with zinc dust is usually found effective, and the methods employed for removing iron also result in the simultaneous removal of arsenic and antimony when present.

Various methods have been put forward for removing these impurities from zinc solutions. Thus, it has been proposed to treat such solutions with oxidizing agents, for example, to bring about the precipitation of cobalt by oxidation with a manganate or a permanganate and subsequent precipitation of the manganese by means of lead peroxid or a simple soluble manganese salt, and to remove iron or manganese from zinc solutions by treatment with a dioxid, such as lead or barium dioxid, in conjunction with oxygen.

According to the present invention a process for the purification of zinc solutions, such as zinc sulfate solutions, from cobalt consists in treating the solutions with lead peroxid or manganese dioxid or a mixture thereof, such for example as the mud usually obtained from electrolytic cells during the deposition of zinc from manganiferous zinc sulfate solutions with lead anodes, and in carrying out the process it is found preferable to treat the solutions in a warm condition, for example at a temperature of from 80° C. to 100° C.

The solutions may also be purified from nickel, when such is present, by treating them with zinc in a form presenting a large surface, the said solutions being in a warm condition, for example at a temperature of from 80° C. to 100° C., as is described in our co-pending application Serial No. 296,552, filed May 12, 1919 and entitled Purification of zinc solutions. The finely divided zinc employed may conveniently be zinc fume or blue powder which has been washed with acid for the purpose of removing the oxid coating and rendering the zinc more efficacious as a precipitating agent.

In carrying the present invention into effect zinc sulfate liquors, obtained for example by treating an ore, roasted if necessary, with the acid liquors from electrolytic cells in which zinc has been deposited, are first treated for the removal of iron, arsenic, antimony, copper and cadmium.

The liquors are then treated for the removal of cobalt by adding to them a small proportion of lead peroxid or manganese dioxid or a mixture thereof, as for example the sludge produced from lead anodes in electrolytic cells in which the zinc is deposited from manganiferous solutions. The liquors are preferably maintained at a temperature of from 80° to 100° C., and are gently stirred by mechanical means or by the introduction of compressed air. The reaction is greatly facilitated when the liquor is maintained at this temperature, and the time, and consequently the cost of the operation, is thereby reduced. For this purpose the liquors are conveniently treated in a vessel having means to stir or agitate them gently, such for example as a paddle and baffles, and means to heat them, as for example pipes fed with waste steam arranged in the vessel.

The proportion of the reagent employed is usually 1 part to 200 parts of liquor, this constituting a large excess of the reagent. The cobalt is precipitated as a higher oxid. The reactions may be indicated by the following equations—

$$2CoSO_4 + PbO_2 + H_2O = Co_2O_3 + H_2SO_4 + PbSO_4,$$

$$2CoSO_4 + MnO_2 + H_2O = Co_2O_3 + H_2SO_4 + MnSO_4,$$

or $$3CoSO_4 + 2H_2O + PbO_2 = Co_3O_4 + 2H_2SO_4 + PbSO_4.$$

Thus when lead peroxid is employed lead sulfate is produced which is precipitated with the cobalt, and when manganese dioxid is employed manganese sulfate goes into solution and is decomposed with the precipitation of manganese dioxid during the subsequent electrolytic step. The manganese sulfate does not interfere with the electrolytic deposition of the zinc.

The whole of the cobalt is thus precipitated and the solutions are filtered to separate the excess of the precipitating agent, with the precipitated cobalt oxid.

With the quantity of reagent mentioned above, namely 1 part to 200 parts of liquor, it may be used several times before becoming ineffective. Subsequently small additions of fresh lead peroxid are made, but after a time the material requires revivification. This may be accomplished electrolytically. The spent lead peroxid is subjected to the action of anodic oxygen in an electrolytic cell in which weak sulfuric acid containing a small quantity of nitric acid or a nitrate constitutes the electrolyte, or alternatively a solution of common salt is employed. The lead peroxid is thus re-formed with no loss except that due to handling. Alternatively the lead may be recovered from the spent lead peroxid by smelting it with other lead-containing materials.

The liquors are then warmed to from 80° C. to 100° C., a quantity of zinc in a form presenting a large surface for action in comparison with the mass of metal such for example as zinc fume which has been previously washed with sulfuric acid, is added, and they are gently stirred or agitated. The quantity of zinc fume we have found it desirable to employ is of the order of one part to 200 parts of liquor, and as the nickel is ordinarily present only at the rate of 10 to 20 parts per million of solution, this quantity constitutes a large excess over that theoretically necessary for the removal of the nickel. The removal of nickel takes place by substitution, an equivalent of zinc passing into the solution.

The zinc fume can be used several times for the treatment of different batches of impure zinc solutions, but although still containing much metallic zinc, it is found to become ineffective, when the excess of zinc may be recovered by solution in weak sulfuric acid, for example a portion of the acid liquors produced in the electrolytic cells, or by other chemical means, and the zinc sulfate solution so obtained added to the electrolytic circuit, if desired.

The clear solutions are then ready for treatment by electrolysis for the deposition of the zinc.

In carrying the invention into effect a low grade lead peroxid may be used, such for example as a waste product from accumulator manufacture.

By the process described above zinc liquors containing cobalt with or without nickel in an amount sufficient to render electrolytic extraction of zinc impracticable are purified to a high degree, the cobalt being reduced to from one-half to one part per million parts of liquor or even completely.

What we claim as our invention and desire to secure by Letters-Patent is:—

1. A process for the purification of zinc solutions from cobalt, which comprises treating the solution, freed from iron, arsenic, antimony, copper and cadmium, with peroxid of lead, with application of heat.

2. A process for the purification of zinc solutions from cobalt, which comprises treating the solution, freed from iron, arsenic, antimony, copper and cadmium, with a mixture of lead peroxid and manganese dioxid, with application of heat.

3. A process for the purification of zinc solutions from cobalt, which comprises treating the solution, freed from iron, arsenic, antimony, copper and cadmium, with peroxid of lead, at a temperature of 80°–100° C.

4. A process for the purification of zinc sulfate solutions from cobalt, which comprises treating the solution, freed from iron, arsenic, antimony, copper and cadmium, with a mixture of lead peroxid and manganese dioxid at a temperature of 80°–100° C.

5. A process for the purification of zinc sulfate solutions from cobalt, which comprises treating the solutions, freed from iron, arsenic, antimony, copper and cadmium, with the sludge obtained from electrolytic cells, with lead anodes, in which zinc has been deposited from manganiferous solutions, at a temperature of 80°–100° C.

6. In the process for the purification of zinc solutions from cobalt, which comprises treating the solutions, freed from iron, arsenic, antimony, copper and cadmium, with peroxid of lead, revivifying the peroxid by submitting it to the action of anodic oxygen in an electrolytic cell and treating a further quantity of zinc solution with the revivified peroxid.

7. In the process for the purification of zinc solutions from cobalt, which comprises treating the solution, freed from iron, arsenic, antimony, copper and cadmium, with peroxid of lead, removing nickel by means of agitation with finely-divided zinc at an elevated temperature.

8. In the process for the purification of zinc sulfate solutions from cobalt, which comprises treating the solution, freed from iron, arsenic, antimony, copper and cadmium, with the sludge obtained from electrolytic cells with lead anodes in which zinc has been deposited from manganiferous solutions, removing nickel by means of agitation with finely-divided zinc at an elevated temperature.

In testimony whereof we have signed our names to this specification in the presence of two subscribing witnesses.

HENRY LIVINGSTONE SULMAN.
SAMUEL FIELD

Witnesses:
H. K. HIDE,
A. W. SHEPHERD.